United States Patent
Yoshida et al.

(10) Patent No.: US 9,853,293 B2
(45) Date of Patent: Dec. 26, 2017

(54) LITHIUM SECONDARY BATTERY AND METHOD FOR PRODUCING SAME

(71) Applicant: TOYOTA JIDOSHA KABUSHIKI KAISHA, Toyota-shi, Aichi (JP)

(72) Inventors: Jun Yoshida, Suntou-gun (JP); Kunihiro Nobuhara, Susono (JP); Yoshiumi Kawamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 14/353,430

(22) PCT Filed: Oct. 30, 2012

(86) PCT No.: PCT/JP2012/077966
§ 371 (c)(1),
(2) Date: Apr. 22, 2014

(87) PCT Pub. No.: WO2013/069502
PCT Pub. Date: May 16, 2013

(65) Prior Publication Data
US 2014/0295277 A1  Oct. 2, 2014

(30) Foreign Application Priority Data
Nov. 10, 2011 (JP) ................................. 2011-246658

(51) Int. Cl.
*H01M 4/58* (2010.01)
*H01M 4/62* (2006.01)
(Continued)

(52) U.S. Cl.
CPC ............. *H01M 4/625* (2013.01); *C01B 25/45* (2013.01); *H01M 4/5825* (2013.01); *H01M 4/485* (2013.01); *H01M 10/0525* (2013.01)

(58) Field of Classification Search
CPC .......... H01M 4/58; H01M 4/62; H01M 4/625; H01M 4/5825; H01M 4/485; H01M 10/0525; C01B 25/45
See application file for complete search history.

(56) References Cited

U.S. PATENT DOCUMENTS

| 6,296,830 B1 | 10/2001 | Oh et al. |
| 2003/0054253 A1 | 3/2003 | Morishima et al. |

(Continued)

FOREIGN PATENT DOCUMENTS

| CN | 1754275 A | 3/2006 |
| CN | 1785823 A | 6/2006 |

(Continued)

OTHER PUBLICATIONS

Chen et al., "Thermal instability of Olivine-type LiMnPO$_4$ cathodes," Journal of Power Sources, 2010, pp. 1221-1224, vol. 195, Elsevier B.V.

(Continued)

*Primary Examiner* — Jonathan G Leong
*Assistant Examiner* — Seenam Agbetiafan
(74) *Attorney, Agent, or Firm* — Oliff PLC

(57) ABSTRACT

A lithium secondary battery is provided which can exhibit excellent battery performances for a long period of time and has an excellent crystal structure stability. The positive electrode of the lithium secondary battery provided according to the present invention includes positive electrode active material particles mainly containing a lithium-containing phosphate compound represented by the general formula: $Li_xM[P_{(1-y)}A_y]O_4$, where M is one or two or more elements selected from the group consisting of Ni, Mn, Fe and Co; A is a pentavalent metal element; and x and y are real numbers satisfying $0 < x \leq 2$ and $0 < y \leq 0.15$.

14 Claims, 10 Drawing Sheets

(51) Int. Cl.
*C01B 25/45* (2006.01)
*H01M 4/485* (2010.01)
*H01M 10/0525* (2010.01)

(56) References Cited

U.S. PATENT DOCUMENTS

| | | | |
|---|---|---|---|
| 2006/0292444 A1 | 12/2006 | Chiang et al. | |
| 2009/0081534 A1* | 3/2009 | Takami | H01M 2/1626 429/149 |
| 2010/0028777 A1 | 2/2010 | Ueda et al. | |
| 2010/0233540 A1* | 9/2010 | Choy | C01B 25/45 429/220 |
| 2012/0121985 A1 | 5/2012 | Yoshida | |
| 2012/0129050 A1 | 5/2012 | Tarascon et al. | |
| 2012/0264019 A1 | 10/2012 | Saka | |
| 2014/0065484 A1 | 3/2014 | Yoshida | |

FOREIGN PATENT DOCUMENTS

| | | | | |
|---|---|---|---|---|
| JP | 11-025983 | | 1/1999 | |
| JP | 2004-063270 A | | 2/2004 | |
| JP | 2007042440 | * | 2/2007 | ............ H01M 10/05 |
| JP | A-2010-40272 | | 2/2010 | |
| JP | 2010-192230 A | | 9/2010 | |
| JP | A-2010-267501 | | 11/2010 | |
| JP | 2011-213587 A | | 10/2011 | |
| WO | 2011013243 A1 | | 2/2011 | |
| WO | WO 2012/150636 A1 | | 11/2012 | |

OTHER PUBLICATIONS

Garcia-Moreno et al., "Influence of the Structure on the Electrochemical Performance of Lithium Transition Metal Phosphates as Cathodic Materials in Rechargeable Lithium Batteries: A New High-Pressure Form of LiMPO4 (M=Fe and Ni)," Chemistry of Materials, vol. 13, No. 5, 2001, pp. 1570-1576.
Mar. 27, 2017 Office Action issued in U.S. Appl. No. 14/115,224.
Apr. 22, 2016 Office Action issued in U.S. Appl. No. 14/115,224.
Feb. 22, 2016 Office Action issued in U.S. Appl. No. 14/115,224.
Jul. 31, 2017 Office Action issued in U.S. Appl. No. 14/115,224.

* cited by examiner

[FIG. 1]
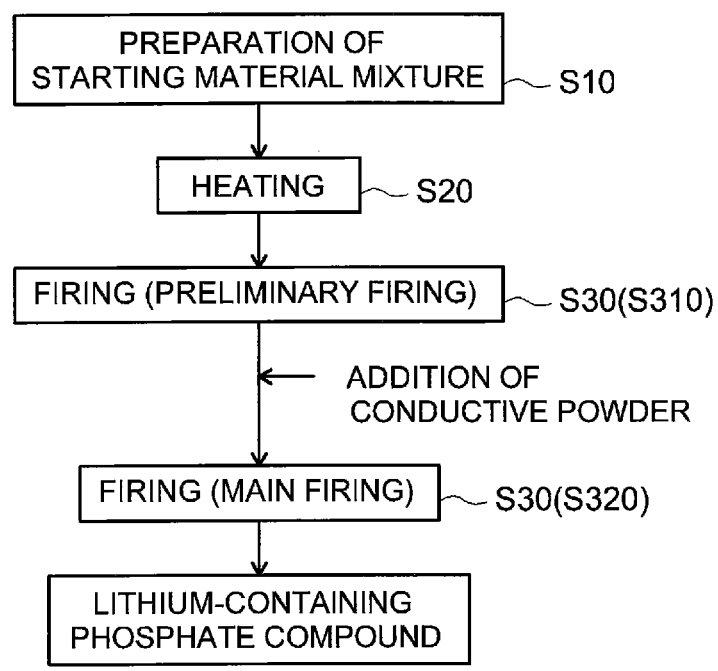

[FIG. 2]
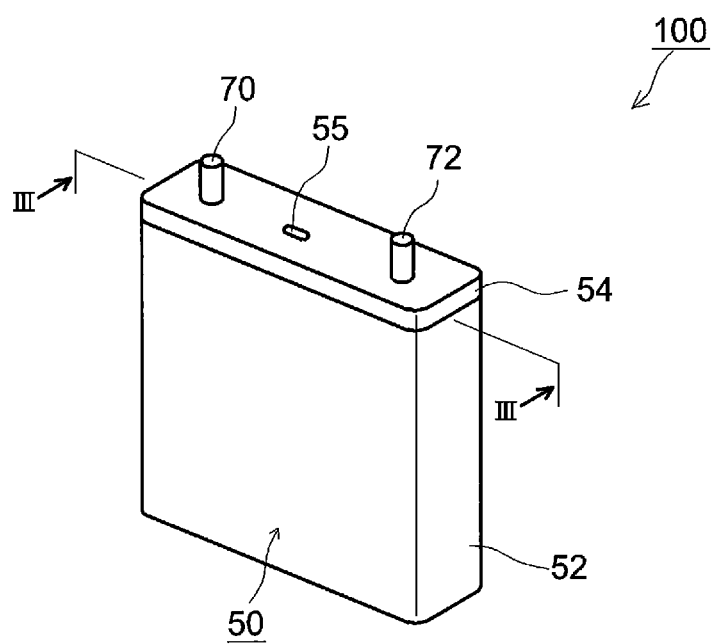

[FIG. 3]
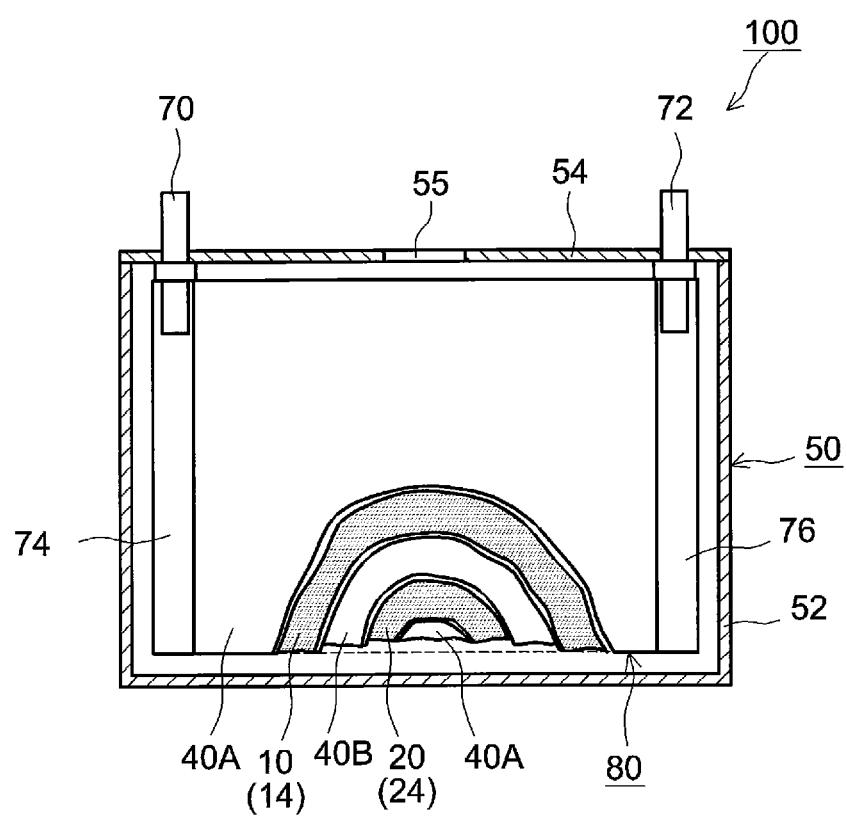

[FIG. 4]
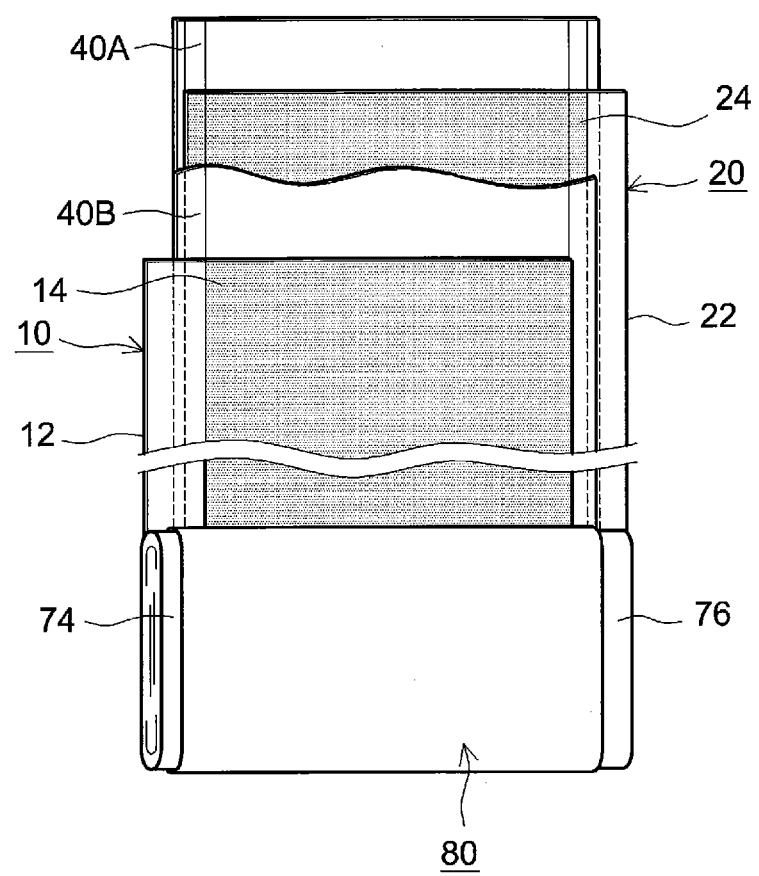

[FIG. 5]
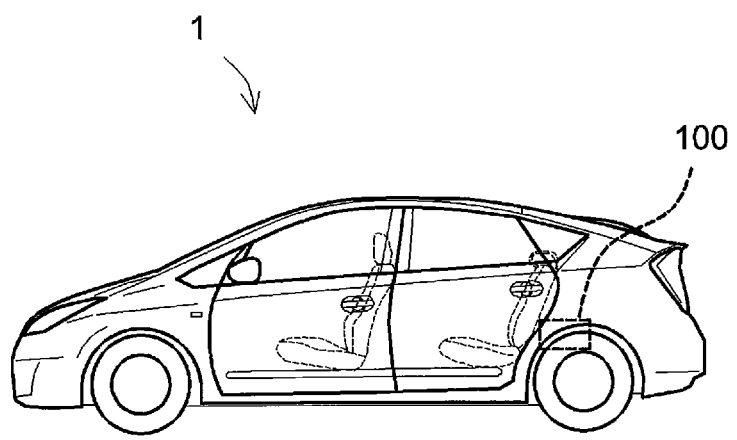

[FIG. 6]
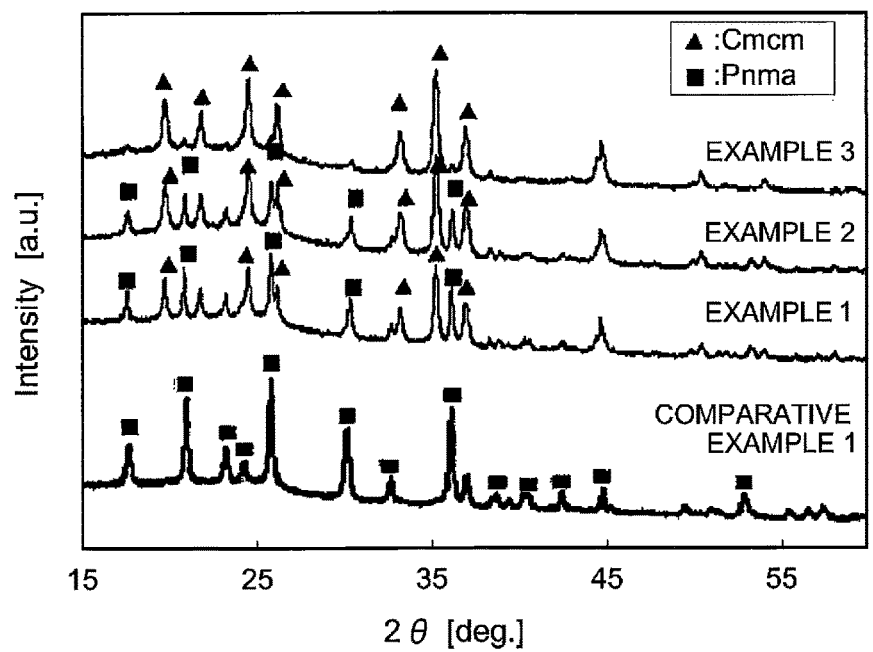

[FIG. 7]
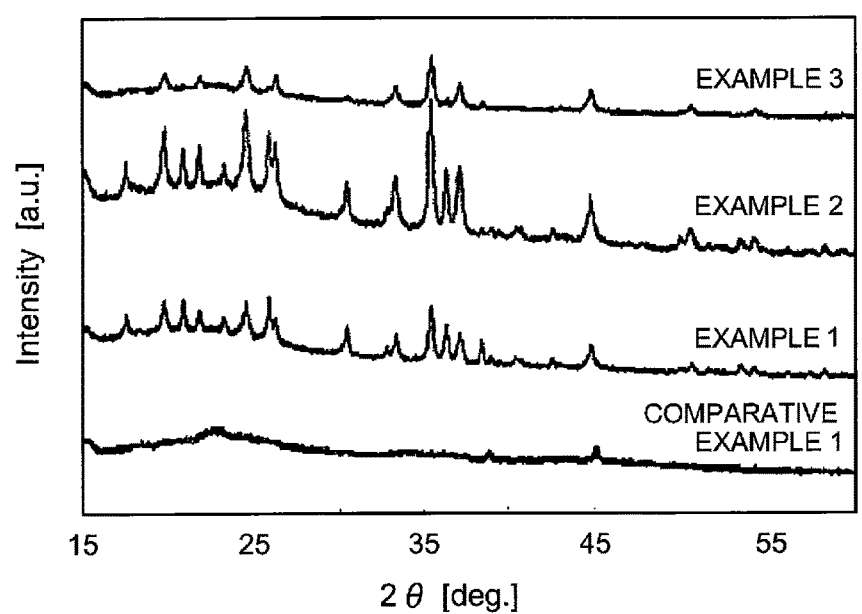

[FIG. 8]
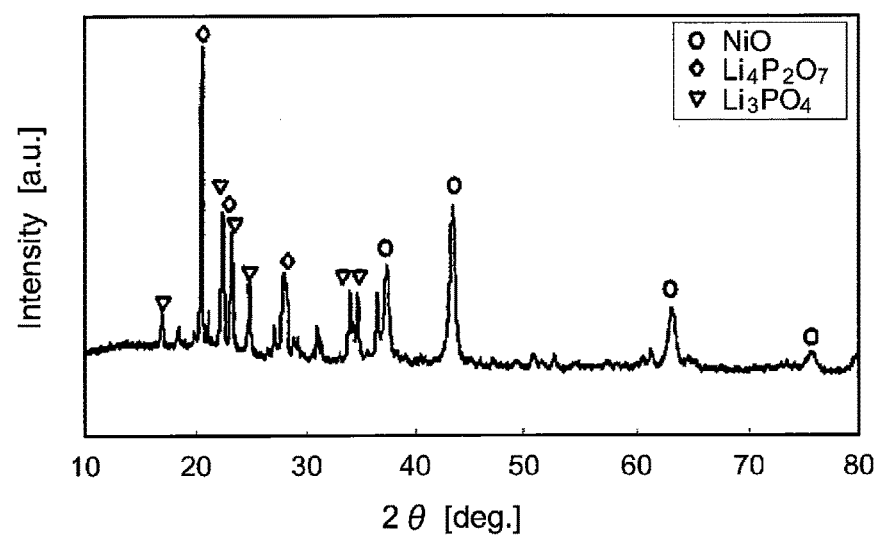

[FIG. 9]
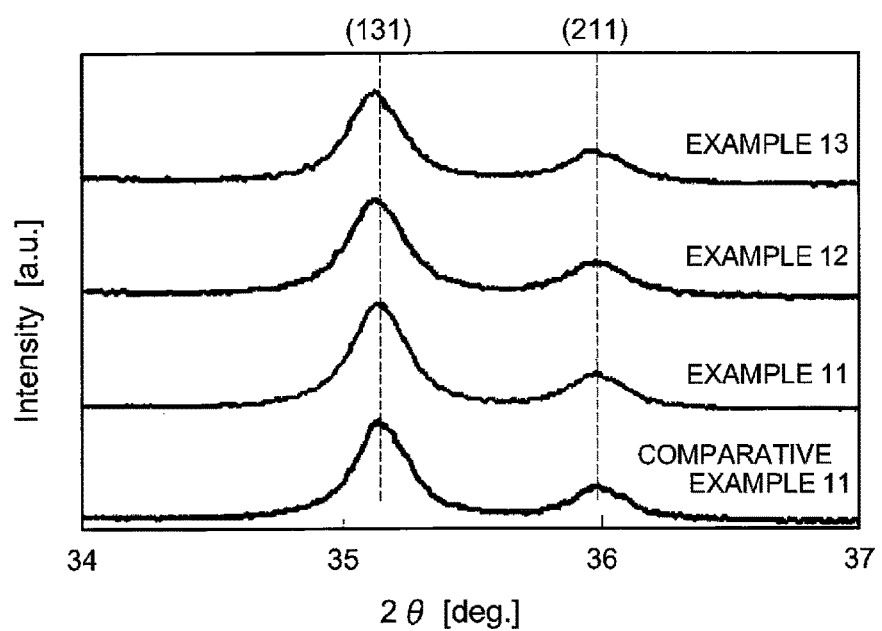

[FIG. 10]
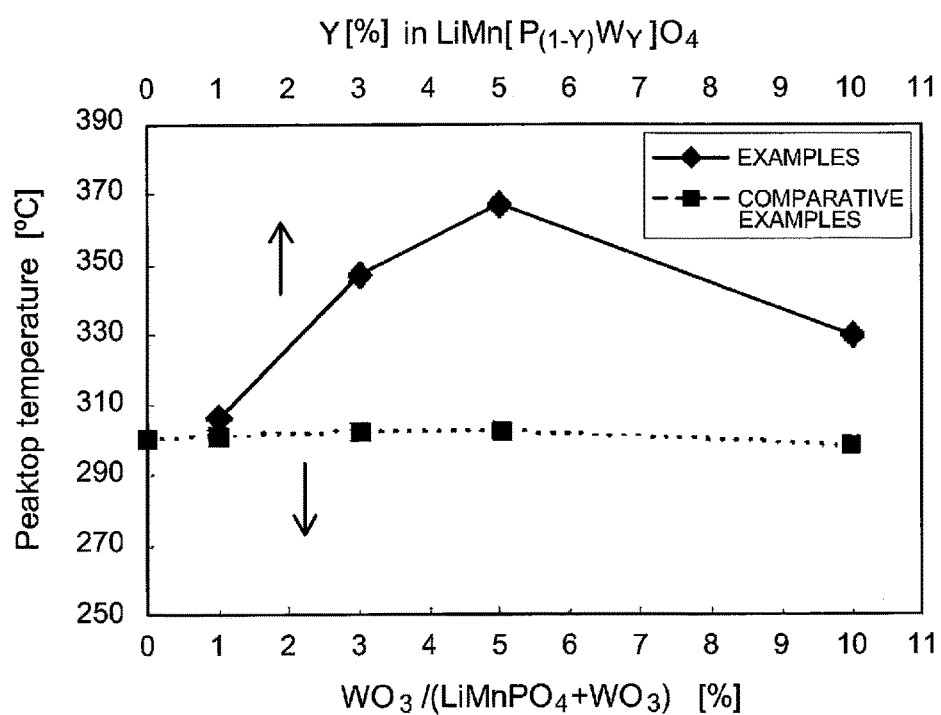

LITHIUM SECONDARY BATTERY AND METHOD FOR PRODUCING SAME

TECHNICAL FIELD

The present invention relates to a lithium secondary battery. Specifically, the present invention relates to a lithium secondary battery including a positive electrode containing a positive electrode active material exhibiting excellent crystal structure stability.

The present international application claims priority to Japanese Patent Application No. 2011-246658 filed on 10 Nov. 2011, the disclosure of which is hereby incorporated by reference in its entirety.

BACKGROUND ART

Lithium ion batteries and other lithium secondary batteries are miniaturized, have light weight, have high energy density and have excellent power density compared to existing batteries. Therefore, these batteries have been preferably used in recent years as so-called portable power sources for personal computers, mobile terminals and the like and vehicle driving power sources.

Such lithium secondary batteries are configured to comprise an electrode assembly having a positive electrode and a negative electrode and an electrolyte (typically electrolyte solution), which are contained in a battery case. Charging and discharge are carried out by means of transfer of lithium ions ($Li^+$) back and forth between the positive electrode and the negative electrode. One of important members that determine the battery performances is a positive electrode material (positive electrode active material). Recently, olivine-type lithium-containing phosphate compounds ($LiMPO_4$ (M: at least one element selected from Ni, Mn, Fe and Co); hereinafter sometimes merely referred to as "lithium-containing phosphate compounds") having a crystal structure belonging to the space group Pnma have been attracting attention as positive electrode active materials allowing high energy density. Prior arts relating to the compounds may include Patent Literature 1 and Patent Literature 2.

CITATION LIST

Patent Literature

Patent Literature 1: Japanese Patent Application Publication No. 2010-267501
Patent Literature 2: Japanese Patent Application Publication No. 2010-040272

SUMMARY OF INVENTION

In lithium secondary batteries, lithium ions ($Li^+$) are released from positive electrode active materials in conjunction with charge reaction. Upon this release, charge compensation (typically oxidation of transition metal ions (e.g., $Ni^{2+} \rightarrow Ni^{3+}$)) occurs in the positive electrode active materials, thereby maintaining electroneutrality. However, lithium-containing phosphate compounds have an unstable crystal structure in high potential regions compared to other positive electrode active materials. Therefore, structural elements (elemental oxygen and the like) may be extracted upon charge compensation at a high charge depth status, resulting in disruption of crystal structure. In this case, lithium ions may be no longer (or less) absorbed and stored or released in subsequent charge and discharge, resulting in deterioration of battery performances such as cycle characteristics. Stabilization of the crystal structure may be an issue upon utilization of lithium-containing phosphate compounds as a positive electrode active material.

With the forgoing in view, it is an object of the present invention to provide a lithium secondary battery comprising, as a positive electrode active material, a lithium-containing phosphate compound without disruption of crystal structure even in a high potential region, i.e., having an excellent crystal structure stability. Another object of the present invention is to provide a suitable method for producing the lithium-containing phosphate compound.

In order to achieve the above objects, the present invention provides a lithium secondary battery including an electrode assembly having a positive electrode and a negative electrode. The positive electrode contains positive electrode active material particles mainly containing an olivine-type lithium-containing phosphate compound represented by the general formula: $Li_xM[P_{(1-y)}A_y]O_4$, wherein M is one or two or more elements selected from the group consisting of nickel (Ni), manganese (Mn), iron (Fe) and cobalt (Co); and x and y are real numbers satisfying $0 < x \leq 2$ and $0 < y \leq 0.15$ (preferably $0.01 \leq y \leq 0.15$). The compound is characterized in that the A element in the formula is a pentavalent metal element.

The lithium-containing phosphate compound disclosed herein contains pentavalent metal elements (A elements) substituting some P elements, thereby having an excellent crystal structure stability (e.g., thermostability) compared to conventional lithium-containing phosphate compounds (I.e., lithium-containing phosphate compounds without substitution of P elements). Therefore, the crystal structure is less disrupted even in a high potential region (e.g., 6 V (vs. $Li^+/Li$) or higher). In addition, the crystal structure has an interlayer spacing suitable for absorption and storage and release of lithium ions. Thus, the lithium secondary battery including the lithium-containing phosphate compound as the positive electrode active material has excellent cycle characteristics (durability) such that, even when the battery is used in an atmosphere at a temperature higher than room temperature, the battery can exhibit excellent battery performances (e.g., energy density, power density) for a prolonged period of time.

Patent Literature 2, meanwhile, discloses a feature in which some Mn elements in the olivine-type lithium-containing manganese phosphate compound are substituted by different elements. However, this feature in Patent Literature 2 aims to improve usage efficiency of positive electrode active materials and no sufficient investigation is provided with regard to the crystal structure stability as described above. Further, in Patent Literature 2, the compound is prepared by so-called solid-phase method (a procedure wherein powder starting material compounds are mixed without melting and are fired); however, as shown in the Test Example <<I. Evaluation test for $LiNiPWO_4$>> described hereinafter, this synthesis method fails to provide the compound having excellent crystal structure stability as the compound disclosed herein.

In a preferred aspect disclosed herein, the pentavalent metal element is tungsten (W).

The lithium-containing phosphate compound containing the element tungsten in the crystal structure has further stabilized structure. In addition, the positive electrode active material containing the element tungsten has an excellent ion diffusivity in solid phase. In other words, use of the positive electrode active material may improve lithium ion diffusivity (mobility) in a positive electrode mixture layer.

Accordingly, the lithium secondary battery containing the lithium-containing phosphate compound as the positive electrode active material can stably exhibit high performances for a prolonged period of time and exhibit further improved durability (reliability) and battery performances.

In a preferred aspect disclosed herein, the lithium-containing phosphate compound includes the space group Cmcm and the space group Pnma.

The crystal structure having the space group Cmcm has excellent stability compared to the crystal structure having only the olivine-type structure belonging to the space group Pnma. Thus, the lithium secondary battery containing the compound as the positive electrode active material can exhibit excellent battery performances (e.g., preferable cycle characteristics).

In a preferred aspect disclosed herein, the lithium-containing phosphate compound contains manganese (Mn) as the M element and y satisfies $0<y\leq 0.1$ (typically $0.01\leq y\leq 0.1$, for example, $0.01\leq y\leq 0.05$).

The lithium-manganese-containing phosphate compound satisfying the above conditions has excellent crystal structure thermostability, thereby resulting in less extraction of elemental oxygen even when a high amount of lithium ions is extracted. Therefore, the lithium secondary battery containing the compound as the positive electrode active material can exhibit excellent cycle characteristics.

In a preferred aspect disclosed herein, the lithium-containing phosphate compound contains nickel (Ni) as the M element and y satisfies $0<y\leq 0.05$ (typically $0.01\leq y\leq 0.05$, for example, $0.01\leq y\leq 0.03$).

The lithium-nickel-containing phosphate compound satisfying the above conditions suitably contains the crystal structure with the space group Cmcm, thereby having excellent crystal structure stability. Thus, the lithium secondary battery containing the compound as the positive electrode active material can exhibit further excellent battery performances (e.g., preferable cycle characteristics).

In a preferred aspect disclosed herein, particles of the positive electrode active material are coated at least partially with conductive powder.

The lithium-containing phosphate compound may exhibit a high energy density while it tends to have low ion conductivity and electron conductivity and thus have high resistance in general. However, the particles of the compound coated with conductive powder as disclosed herein may have compensated electron conductivity and thus an increase in resistance can be suppressed.

In a preferred aspect disclosed herein, the particles of the positive electrode active material have a primary particle diameter, as measured by electron microscopy, of 10 nm to 200 nm.

The positive electrode active material having the primary particle diameter within the above range can smoothly absorb and store and release lithium ions upon charge and discharge reactions. Thus, it may have reduced resistance. In addition, the positive electrode active material may have an improved usage efficiency, thereby resulting in further improved battery performances (e.g., energy density, power density).

In a preferred aspect disclosed herein, the negative electrode contains at least lithium titanate (Lithium Titanium Composite Oxide: LTO) as a negative electrode active material.

The lithium-containing phosphate compound has relatively high potential compared to other positive electrode active materials. Therefore, when the compound is used as the positive electrode active material, it is required to use electrolyte solution having a high potential window (i.e., with a wide potential window on the oxidation side). Such an electrolyte solution tends to have, by contrast to high oxidation resistance, low reduction resistance and thus tends to be reduced and decomposed in negative electrode. Therefore, the negative electrode active material used preferably has a relatively high potential at or higher than 1 V (vs. $Li^+/Li$). A suitable example for the negative electrode active material may include LTOs having a standard potential of approximately 1.55 V (vs. $Li^+/Li$).

In other aspects of the present invention, a method for producing a positive electrode active material for a lithium secondary battery is provided. The method for producing the positive electrode active material encompasses the following steps.

(1) Preparing a starting material mixture by mixing, in an aqueous solvent, a lithium source, a phosphoric acid source, an M element source and an A element source as starting materials for an olivine-type lithium-containing phosphate compound represented by the general formula: $Li_xM[P_{(1-y)}A_y]O_4$, wherein M is one or two or more elements selected from the group consisting of Ni, Mn, Fe and Co, and x and y are real numbers satisfying $0<x\leq 2$ and $0<y\leq 0.15$.

(2) Heating the starting material mixture to obtain a gel-like starting material mixture.

(3) Firing the gel-like starting material mixture at or lower than 800° C.

According to the method, the crystal structure can be controlled at an atomic level and some P elements can be suitably substituted by A elements. Therefore, a homogeneous lithium-containing phosphate compound can be stably produced. In addition, mixing the starting materials in the aqueous solvent to form sol allows uniform diffusion of starting material components. Accordingly, compound particles having high crystallinity and low particle diameter (typically having a primary particle diameter of 200 nm or lower) can be suitably produced. The thus produced positive electrode active material has excellent crystal structure stability, and thus the lithium secondary battery containing the positive electrode active material has excellent cycle characteristics (durability) such that the battery can exhibit excellent battery performances (e.g., energy density, power density) for a prolonged period of time.

In a preferred aspect disclosed herein, the starting material mixture is prepared in the aqueous solvent having pH 3 or lower.

Under this condition, production of impurities such as hydroxides may be suitably suppressed. Therefore, the lithium-containing phosphate compound having a high purity can be stably and effectively produced.

In a preferred aspect disclosed herein, a chelating agent is added in the preparation of the starting material mixture.

Addition of the chelating agent allows uniform dispersion of particle starting material compounds in the aqueous solvent. Therefore, the homogeneous lithium-containing phosphate compound can be stably synthesized. By coating the particles with the chelating agent, excessive growth of the particles can be suppressed, thereby suitably providing the compound having a low particle diameter.

In a preferred aspect disclosed herein, the firing comprises the following steps.

(3-1) Preliminarily firing the gel-like starting material mixture at or lower than 400° C.

(3-2) Mixing a product resulting from the preliminary firing with conductive powder and subjecting the mixture to main firing at a temperature at or higher than the preliminary firing temperature and at or lower than 800° C.

By preliminarily firing at a low temperature as relatively low as 400° C. or lower prior to firing at a drastically high temperature, the crystal structure of the lithium-containing phosphate compound can grow stepwise. Therefore, the further homogeneous compound can be stably produced. By adding the conductive powder and carrying out the main firing after preliminary firing, the particles of the compound can be suitably coated with the conductive powder, resulting in effective improvement in conductivity.

In a preferred aspect disclosed herein, the preliminary firing is carried out at 120° C. to 400° C.

The preliminary firing at this temperature range allows gradual volatilization of the aqueous solvent and thus suppression of growth of the lithium-containing phosphate compound crystal while providing sufficient removal of the solvent. Therefore, the compound can be suitably coated with the conductive powder in the subsequent main firing, thereby producing the compound having improved conductivity.

In a preferred aspect disclosed herein, the conductive powder used is a carbon material having a primary particle diameter, as measured by electron microscopy, of 10 nm to 100 nm.

The conductive powder coating the lithium-containing phosphate compound suitably has a low primary particle diameter and thus a high specific surface area in order to improve conductivity. The conductive powder having low particle diameter can uniformly coat the compound, thereby forming a thinner homogeneous conductive film.

The lithium secondary battery disclosed herein can be applied for various applications, and for example can be suitably used as a power source for batteries used on vehicles because the battery has high thermostability and excellent durability. Accordingly, the lithium secondary battery disclosed herein can be suitably used as a power source for vehicles such as plug-in hybrid vehicles (PHVs), hybrid vehicles (HVs), electric vehicles (EVs), fuel cell vehicles (FCVs) and the like.

BRIEF DESCRIPTION OF DRAWINGS

FIG. 1 is a processing flow chart showing a production process of the olivine-type lithium-containing phosphate compound according to an embodiment;

FIG. 2 is a perspective view schematically showing an outline of the lithium secondary battery according to an embodiment;

FIG. 3 is a section view of the lithium secondary battery taken along line III-III of FIG. 2;

FIG. 4 is a diagrammatic view showing the configuration of a wound electrode assembly of the lithium secondary battery according to an embodiment;

FIG. 5 is a side view schematically showing a vehicle (automobile) comprising the lithium secondary battery according to an embodiment as a vehicle driving power source;

FIG. 6 is a graph obtained by measuring X-ray diffraction patterns immediately after synthesis of LiNiPWO$_4$;

FIG. 7 is a graph obtained by measuring X-ray diffraction patterns after the CV test of LiNiPWO$_4$;

FIG. 8 is a graph obtained by measuring X-ray diffraction patterns immediately after synthesis of LiNiPWO$_4$;

FIG. 9 is a graph obtained by measuring X-ray diffraction pattern of LiMnPWO$_4$; and FIG. 10 is a graph representing the exothermic peak top temperature obtained from DSC measurement of LiMnPWO$_4$.

DESCRIPTION OF EMBODIMENTS

The term "lithium secondary battery" as used herein refers to a secondary battery utilizing lithium ions as electrolyte ions and effectuates charge and discharge by transfer of electric charge accompanying with lithium ions between positive and negative electrodes. Typical examples of the lithium secondary battery as used herein may encompass secondary batteries generally referred to as lithium ion batteries (or lithium ion secondary batteries), lithium polymer batteries, lithium air batteries, lithium sulphur batteries and the like.

The term "active material" as used herein refers to a substance (compound) involved in electricity storage at the positive electrode side or the negative electrode side. Namely, the active material refers to a substance involved in absorption and storage and release (typically insertion and extraction) of electrons during charge and discharge of batteries.

Suitable embodiments of the lithium secondary battery disclosed herein are hereinafter illustrated. The matters which are not particularly referred to herein and are necessary for the practice of the present invention (e.g., configurations and production methods of electrode assemblies including positive electrodes and negative electrodes, configurations and production methods of separators and electrolytes, general techniques relating to the construction of lithium secondary batteries and other batteries) are understood to be design matters by a person skilled in the art based on conventional techniques in the art. The lithium secondary battery having such a configuration can be put into practice based on the content disclosed herein and the common technical knowledge in the art.

<<Lithium-Containing Phosphate Compound>>

The lithium secondary battery disclosed herein includes a positive electrode active material which mainly contains a particle olivine-type lithium-containing phosphate compound represented by the general formula: Li$_x$M[P$_{(1-y)}$A$_y$]O$_4$. It is characterized in that P element is substituted by A element (pentavalent metal element). Such a lithium-containing phosphate compound has excellent crystal structure stability (e.g., thermostability) compared to conventional (i.e., without substitution of P elements) compounds. Therefore, the lithium secondary battery containing the lithium-containing phosphate compound as the positive electrode active material has high cycle characteristics (durability) such that the battery can exhibit excellent battery performances (e.g., energy density, power density) for a prolonged period of time.

The M element in the above general formula is one or two or more elements selected from nickel (Ni), manganese (Mn), iron (Fe) and cobalt (Co). Thus, the M element may be only Ni, or may be a combination of multiple elements such as Ni$_{1/3}$Co$_{1/3}$Mn$_{1/3}$, for example. Among others, LiNiPO$_4$ corresponding to the M element being Ni is preferably used because it exhibits a high potential of the order of 5 V (e.g., 4.6 V (vs. Li$^+$/Li) or higher) and thus can exhibit high energy density.

The A element in the above general formula is a pentavalent metal element. Such a metal element may include, for example, metal elements belonging to the so-called niobium group (tungsten (W), molybdenum (Mo), tantalum (Ta) and niobium (Nb)). Among others, group 6 metal elements (W, Mo) may be suitably used that have high electrochemical stability (i.e., low activity). The lithium-containing phosphate compound having the crystal structure containing a group 6 metal element (e.g., W) may have more stabilized structure. The A element may also contain two or more elements, as is the case for the M element.

The value x in the above general formula represents the proportion of lithium in the lithium-containing phosphate compound and can be a real number in the range of $0 < x \le 2$ (typically $0 < x \le 1.2$). The compound can also be in a so-called lithium excessive form containing excessive lithium ions in an amount represented by, for example, $1 < x \le 2$ (typically x=1.2 or 2), provided that the crystal structure of the compound is maintained without disruption.

The value y in the general formula represents the proportion of substitution of P element by A element (pentavalent metal element) in the lithium-containing phosphate compound. The possible range of y may be any real numbers within $0 < y \le 0.15$, provided that the crystal structure of the olivine-type lithium-containing phosphate compound represented by the general formula can be maintained without disruption. y may be preferably $0 < y \le 0.1$, more preferably $0.01 \le y \le 0.1$, for example $0.01 \le y \le 0.05$.

In a preferred embodiment, the lithium-containing phosphate compound contains Mn as the M element and y satisfies $0 < y \le 0.1$. In other words, the positive electrode active material contained is the olivine-type lithium-manganese-containing phosphate compound represented by the general formula: $Li_x(Mn_\alpha M^1_{(1-\alpha)})[P_{(1-y)}A_y]O_4$. In the formula, $M^1$ is one or two or more elements selected from the group consisting of Ni, Fe and Co; A is a pentavalent metal element; and x, y and $\alpha$ are real numbers satisfying $0 < x \le 2$, $0 < y \le 0.1$ (typically $0.01 \le y \le 0.1$, preferably $0.01 \le y \le 0.05$) and $0 < \alpha \le 1$. The lithium-manganese-containing phosphate compound satisfying the above conditions have further excellent crystal structure thermostability and thus elemental oxygen is less extracted even when a high amount of lithium ions is extracted. Thus, the lithium secondary battery containing the compound as the positive electrode active material can exhibit excellent cycle characteristics.

The positive electrode active material used herein preferably has the crystal structure with both the space group Cmcm and the space group Pnma. The compound having the orthorhombic crystal structure belonging to the space group Cmcm has excellent crystal structure stability (e.g., thermostability) compared to the conventional olivine-type structures belonging to the space group Pnma. Thus, the lithium secondary battery containing the positive electrode active material has less disruption of the crystal structure in conjunction with battery reactions (absorption and storage and release of lithium ions) even in a high potential region (e.g., 6 V (vs. Li$^+$/Li) or higher). Accordingly, as shown in Examples <<I. Evaluation test for LiNiPWO$_4$>> described hereinafter, the crystal structure with both the space group Cmcm and the space group Pnma can exhibit preferable cycle characteristics. The "space group" of the compound can be confirmed by measuring a test substance (may be powder or an electrode) with a standard X-ray diffraction method and analyzing the resulting diffraction pattern. Specific measurement conditions are specifically described in Examples <<I. Evaluation test for LiNiPWO$_4$>> described hereinafter.

In a preferred embodiment, the lithium-containing phosphate compound contains Ni as the M element and y satisfies $0 < y \le 0.05$. In other words, the positive electrode active material contained is the olivine-type lithium-nickel-containing phosphate compound represented by the general formula: $Li_x(Ni_\beta M^2_{(1-\beta)})[P_{(1-y)}A_y]O_4$. In the formula, $M^2$ is one or two or more elements selected from the group consisting of Mn, Fe and Co; A is a pentavalent metal element; and x, y and $\beta$ are real numbers satisfying $0 < x \le 2$, $0 < y \le 0.05$ (typically $0.01 \le y \le 0.05$, preferably $0.01 \le y \le 0.03$) and $0 < \beta \le 1$. The lithium-nickel-containing phosphate compound satisfying the above conditions may contain the crystal structure with the space group Cmcm.

The particles of the positive electrode active material used herein preferably have a primary particle diameter of approximately 10 nm to 200 nm (typically approximately 10 nm to 100 nm, for example approximately 10 nm to 50 nm). When the primary particle diameter is too low, the positive electrode mixture slurry described hereinbelow may have an impaired applicability. On the other hand, when the particle diameter is too high, the contact area between particles of the active material is low and thus an insufficient conductivity may result. In addition, the resistance upon absorption and storage and release of lithium ions during battery reactions may increase or the absorption and storage and release per se may be impaired. When the primary particles have the particle diameter within the above range, the resistance can be reduced and further improved battery performances (e.g., energy density, power density) can be obtained.

The "primary particle diameter" as used herein may be obtained by observing at least 30 (e.g., 50 to 200, typically 100) primary particles under an electron microscope (either of scanning or transmission type, preferably transmission electron microscope) and calculating the arithmetic average (average particle diameter) of particle diameters measured from the resulting micrograph.

The particles of the positive electrode active material used herein are preferably at least partially (preferably 50% or more, more preferably 70% or more of the surface area) coated with conductive powder. In other words, the particles of the positive electrode active material have conductive powder physically attached to at least a part of the surface thereof. The lithium-containing phosphate compound may have a high theoretical capacity, while it tends to have low ion conductivity and electron conductivity and thus high resistance in general. However, the particles of the compound coated with conductive powder as disclosed herein can have compensated electron conductivity and thus the resistance can be reduced.

The conductive powder used may preferably be a carbon material (carbon powder). Specifically, one or two or more selected from various carbon black (e.g., acetylene black (AB), furnace black, ketjen black (KB), channel black, lamp black, thermal black), graphite powder and the like may be used. Among others, carbon black (typically acetylene black or ketjen black) can be particularly preferably used. The conductive material used herein advantageously has a relatively low primary particle diameter which results in a wide specific surface area, thereby resulting in improvement in the conductivity of the positive electrode active material. When carbon powder is used for example, the primary particles forming the powder preferably have a particle diameter within the range of approximately 10 nm to 100 nm (typically approximately 20 nm to 70 nm, for example approximately 30 nm to 50 nm).

<<Production Method of Lithium-Containing Phosphate Compound>>

The lithium-containing phosphate compound (Li$_x$M[P$_{(1-y)}$A$_y$]O$_4$) disclosed herein can be suitably produced by a liquid phase method (typically so-called sol-gel method). More specifically, particle starting materials may be first dispersed in an aqueous solvent to prepare sol and the sol may be heated to convert to gel without flowability followed by firing at a predetermined temperature to synthesize the compound. This procedure allows control of the crystal structure at an atomic level and thus at least some P elements in the general formula can be suitably substituted by A elements (pentavalent metal elements). FIG. 1 is a processing flow chart showing a production process of the olivine-type lithium-containing phosphate compound according to an embodiment. The production method shown in FIG. 1 generally comprises the step of preparing a starting material mixture (S10), the step of heating the resulting starting material mixture (S20) and the step of firing the heated starting material mixture (S30). The step of firing the starting material mixture (S30) comprises the step of preliminary firing (S310) and the step of main firing (S320). The respective steps are illustrated in detail hereinbelow.

<Step of Preparing Starting Material Mixture; S10>

Preparation of the starting material mixture (S10) is first illustrated. In this step, starting materials are first provided that form the lithium-containing phosphate compound. These starting materials are weighed so as to obtain a desired composition ratio and mixed in the aqueous solvent for dissolution or dispersion to prepare the sol state starting material mixture. All the starting materials may be added to the aqueous solvent at once or may be gradually added. The mixing may be accompanied by stirring, if necessary. Stirring allows stable preparation of the starting material mixture within a short time. Stirring can be carried out with stirring means such as a magnetic stirrer or by ultrasonication.

The starting materials used may include at least a lithium source, a phosphoric acid source, an M element (one or two or more elements selected from the group consisting of Ni, Mn, Fe and Co) source and an A element (pentavalent metal element) source. One or two or more additional additives (e.g., pH controlling agent, chelating agent and the like) may also be used, if necessary.

The lithium source is not particularly limited as far as it can be dissolved or uniformly dispersed in the aqueous solvent and may be selected from various lithium compounds. For example, lithium compounds with organic acids such as lithium acetate and lithium oxalate; lithium compounds with inorganic acids such as lithium carbonate, lithium hydroxide and lithium phosphate and the like may be mentioned. Suitable examples may include lithium acetate dihydrate ($Li[CH_3COO] \cdot 2H_2O$) which has high solubility in aqueous solvents.

The phosphoric acid source is not particularly limited as far as it can be dissolved or uniformly dispersed in the aqueous solvent and may be selected from various phosphate compounds. For example, ammonium hydrogen phosphates such as ammonium dihydrogen phosphate ($NH_4H_2PO_4$); triethyl phosphite ($C_6H_{15}O_3P$) and the like can be used. Alternatively, the phosphoric acid source may be phosphoric acid ($H_3PO_4$) or a solution containing phosphoric acid.

The M element source is not particularly limited as far as it can be dissolved or uniformly dispersed in the aqueous solvent and may typically be an organic acid of Ni, Mn, Fe or Co. Specifically, acetate salts, oxalate salts of the metals and the like may be mentioned.

When the M element is Ni, the nickel source may include nickel acetate, nickel carbonate, nickel oxide, nickel nitrate, nickel hydroxide, nickel oxyhydroxide and the like. Among others, nickel (II) acetate tetrahydrate ($Ni[CH_3COO]_2 \cdot 4H_2O$) can be preferably employed which has high solubility in aqueous solvents. When the M element is Mn, the manganese source may include manganese acetate, manganese carbonate, manganese oxide, manganese nitrate, manganese hydroxide, manganese oxyhydroxide, manganese oxalate and the like. Among others, manganese (II) acetate tetrahydrate ($Mn[CH_3COO]_2 \cdot 4H_2O$) can be preferably employed which has high solubility in aqueous solvents. When the M element is Co, the cobalt source may include cobalt acetate, cobalt carbonate, cobalt oxide, cobalt sulphate, cobalt nitrate, cobalt hydroxide, cobalt oxyhydroxide and the like.

The A element source is not particularly limited as far as it can be dissolved or uniformly dispersed in the aqueous solvent and may be selected from various compounds of pentavalent metal elements (e.g., W, Mo, Nb and Ta). Typically, various organic metal salts of the above metals such as alkoxides and oxyalkoxides can be used. When the A element is W, the element source may include tungsten ethoxide, tungsten isopropoxide, tungsten butoxide, tungsten hexaethoxide, tungsten oxyethoxide, tungsten oxybutoxide, tungsten chloride and the like. Among others, tungsten ethoxide may be preferably employed.

The aqueous solvent used herein is typically water; however, the aqueous solvent may be water-based as a whole and may be an aqueous solution (mixed solvent) containing a solvent other than water. The solvent other than water contained in the mixed solvent may be one or two or more appropriately selected from organic solvents (lower alcohols, lower ketones and the like) which may be mixed uniformly with water. The solvent used preferably contains approximately 80% by mass or more (more preferably approximately 90% by mass or more, still more preferably approximately 95% by mass or more) water in the aqueous solvent. Particularly preferable examples may include a solvent substantially made up with water (e.g., water).

In a preferred aspect disclosed herein, the aqueous solvent in the step of preparing the starting material mixture (S10) has strong acidity of $pH \leq 3$ (more preferably $pH \leq 1.5$). Under this condition, production of impurities such as hydroxides can be suppressed, so that the homogeneous lithium-containing phosphate compound having a high purity can be effectively synthesized. pH may be adjusted by adding a predetermined amount of acidic aqueous solution of a compound that can exhibit acidity in the aqueous solvent to the starting material mixture-containing aqueous solution. The compound that can exhibit acidity in the aqueous solvent may appropriately be, for example, inorganic acids such as sulphuric acid, hydrochloric acid and nitric acid; organic acids such as acetic acid and carboxylic acid and the like.

In another preferred aspect disclosed herein, a chelating agent is added to the aqueous solvent in the step of preparing the starting material mixture (S10), thereby the starting materials can be further uniformly dispersed in the aqueous solvent, resulting in synthesis of further homogeneous lithium-containing phosphate compound. The chelating agent coats the surface of particles and can suppress growth of crystals, resulting in the compound having a low particle diameter.

The chelating agent may be the one that can be dissolved or uniformly dispersed in the aqueous solvent. The chelating agent may be, but not limited to, for example organic acids such as hydroxy acids and aminocarboxylic acids, phosphonic acid and salts thereof. Particularly, glycolic acid ($C_2H_4O_3$) or citric acid ($C_6H_8O_7$) which is highly soluble in the aqueous solvent and is inexpensive can be suitably used. The amount of the chelating agent added is not particularly limited; however, it may be 1 equivalent or more (typically 2 molar equivalents or more, e.g., 3 molar equivalents or more) and 10 molar equivalents or less (typically 9 molar equivalents or less, e.g., 8 molar equivalents or less) relative to the molar amount of the lithium-containing phosphate compound to be obtained.

<Step of Heating; S20>

Next, the thus prepared starting material mixture is heated to volatilize the solvent. Thereby, gelation is promoted and the sol state where particles are dispersed can be converted to the gel state without flowability. The starting material mixture may be heated with any means without limitation, which may include, for example, any means such as an oil bath and an electric heating furnace (dryer).

The heating temperature may vary depending on the type of the aqueous solvent used; however, it is necessary to heat at a temperature which sufficiently allows volatilization of at least the solvent (water). The upper limit of the heating temperature may be a temperature below the boiling point of the solvent used. By maintaining the mixture under such a temperature condition, a part of the aqueous solvent gradually volatilizes from the starting material mixture with a prolonged period of time, and thus the components (various ions such as $Li^+$, $P_4^{3-}$, $M^{2+}$ and $A^{5+}$) in the starting material mixture are uniformly dispersed in the gel while suppressing the growth of the crystal. The components in the starting material mixture which have been uniformly dispersed are blended at the ratio approximating the stoichiometric composition. When the mixture is further heated in the step of firing (S30) described hereinbelow, microparticle crystals of the lithium-containing phosphate compound having the stoichiometric composition or the approximate composition thereto are stably grown. As a result, the composition having a high crystallinity can be synthesized. When the solvent used is water, the heating temperature is generally 70° C. or higher, and may be for example approximately 70° C. to 90° C. (preferably approximately 75° C. to 85° C., particularly preferably approximately 80° C.).

The duration of heating is not particularly limited as far as it allows sufficient dispersion of ions and sufficient conversion to the gel state. However, when all the solvent is volatilized and the starting material mixture is solidified, the advantages due to the use of the sol-gel method may not be obtained. Therefore, it is preferable to check the drying state of the solvent and adjust the duration appropriately. The duration is generally about 5 to 72 hours, preferably about 24 to 48 hours. By such a heating, the starting material mixture can be converted to the gel state. The atmosphere may be the one which can stably maintain the gel state. Thus, the mixture may be maintained, depending on the type of the solvent and the starting materials used, in the atmospheric condition, in an inert gas atmosphere such as nitrogen gas or in a sealed container which is charged with appropriate gas.

<Step of Firing; S30>

The gel-like starting material mixture can then be fired at or lower than 800° C. to obtain the lithium-containing phosphate compound of interest. The means for firing is not particularly limited and may be any means such as an electric heating furnace. The atmosphere where firing is carried out is not particularly limited and may be in an inert gas atmosphere such as nitrogen or argon or in the atmospheric condition. Firing is preferably carried out in an inert gas atmosphere, which allows stable synthesis of the further homogeneous lithium-containing phosphate compound. Firing may be carried out over multiple times, if necessary.

In a preferred aspect disclosed herein, the step of preliminarily firing the gel-like starting material mixture at a relatively low temperature range (typically at or lower than 400° C.) (S310) and the step of crushing the product resulting from the preliminary firing and subjecting the crushed material to main firing at a higher temperature range (typically a temperature at or higher than the preliminary firing temperature and at or lower than 800° C.) (S320) are encompassed. Preliminary firing at a temperature as relatively low as 400° C. or lower prior to firing at a drastically high temperature allows step-wise growth of the crystal of the lithium-containing phosphate compound. Therefore, the further homogeneous compound can be produced. Mixing conductive powder after preliminary firing prior to main firing allows suitable coating of the particles of the compound with the conductive powder, resulting in an effective improvement in the conductivity.

<Step of Preliminary Firing; S310>

In the step of preliminary firing (S310), the resulting starting material mixture is preliminarily fired to obtain a product resulting from the preliminary firing. The temperature of the preliminary firing is not particularly limited and may be in a temperature range allowing sufficient removal of the solvent. The temperature is generally 120° C. to 400° C., preferably about 200° C. to 380° C. (e.g., 350° C.). Preliminary firing within such a temperature range allows suppression of growth of the crystal of the lithium-containing phosphate compound by gradual volatilization of the aqueous solvent, while the solvent is sufficiently removed. Therefore, in the subsequent main firing, the compound is suitably coated with the conductive powder, resulting in the compound having a higher conductivity. The duration for the preliminary firing may be the one that allows uniform dispersion and blending of the gel-like components (typically various ions) and may generally be about 5 to 48 hours, preferably about 10 to 24 hours.

In a preferred aspect, the obtained product resulting from the preliminary firing is ground and classified up to an appropriate extent after cooling. Thereby, the product resulting from the preliminary firing can be obtained which is further homogeneous and in the form of fine powder. The grinding may be carried out in a mortar or in a grinding device such as a ball mill, a homogenizer, a jet mill, a planetary mixer, a disper or a kneader. When the grinding device is used, the grinding power of the device (namely running conditions (e.g., rotating speed and shear velocity) of the device and the type of a grinding medium used) may be appropriately adjusted in order to obtain a desired particle diameter. The time required for the grinding may vary depending on the running conditions of the grinding device and the like and may preferably be, in Examples described hereinbelow, for example, 1 hour to 10 hours, more preferably 1 hour to 3 hours.

The grinding can be carried out by adding the conductive powder to the obtained product resulting from the preliminary firing. Mixing the product resulting from the preliminary firing and the conductive powder together allows mixing (including stirring) at the same time as the grinding. The grinding-mixing allows physical attachment of the conductive powder by pressure on at least a part of the particles of the product resulting from the preliminary firing. Thus, the particles of the product resulting from the preliminary firing can be suitably coated with the conductive powder. The conductive powder is carbonized in the subsequent main firing (S320) to form uniform conductive films on the particles of the lithium-containing phosphate compound. The lithium-containing phosphate compound of interest may have a high theoretical capacity, while it may have issues such as low ion conductivity and electron conductivity; however, addition of the conductive powder can compensate electron conductivity. Further, the procedure of mixing may provide an advantage because the procedure may generate heat that provides mechanochemical reactions to crush impurity phases (e.g., starting materials and reaction by-products) which remain due to insufficient reaction.

The conductive powder to be added may preferably be various carbon materials described above. Among others, the materials preferably have a relatively low primary particle diameter because it has higher specific surface area and also can uniformly coat the compound. For example, carbon materials having the primary particle diameter as measured by electron microscopy of 10 nm to 100 nm may be preferably used.

The time for mixing is not particularly limited as far as the product resulting from the preliminary firing can be uniformly coated with the conductive powder, and is appropriately about 10 hours or more, generally about 10 to 30 hours (e.g., 15 to 25 hours). It is described above that grinding of the product resulting from the preliminary firing and addition and mixing of the conductive powder are simultaneously carried out; however, these procedures may be carried out separately. When the procedures are carried out stepwise, the procedures may be sequentially carried out in the same grinding device and the like, or may be carried out by appropriately adjusting the respective grinding devices (or grinding conditions).

<Step of Main Firing; S320>

The obtained mixture of the product resulting from the preliminary firing and the conductive powder is then subjected to main firing to obtain the lithium-containing phosphate compound of interest. The firing temperature is not particularly limited as far as it allows synthesis of the lithium-containing phosphate compound. However, an extremely low firing temperature may decrease the crystallinity. The firing temperature extremely higher than 800° C. may also allow growth of coarse crystal particles and increase in impurities, resulting in modification in the crystal structure. Thus, the firing temperature is generally 400 to 800° C., preferably 450 to 750° C., more preferably 500 to 700° C. The time for firing may be the period that allows uniform reaction of the starting material mixture and may generally be about 1 to 24 hours.

<<Lithium Secondary Battery>>

The lithium-containing phosphate compound disclosed herein has an increased crystal structure stability and can exhibit excellent performances (e.g., high energy density, high power density) for a prolonged period of time. Accordingly, the present invention provides a lithium secondary battery (typically lithium ion battery) comprising the lithium-containing phosphate compound as the positive electrode active material (a component of a positive electrode). The lithium secondary battery can be formed with the same materials and by the same process as conventional secondary batteries except that the lithium-containing phosphate compound disclosed herein is used as the positive electrode active material.

The positive electrode of the lithium secondary battery disclosed herein comprises a positive electrode current collector and a positive electrode mixture layer formed on the positive electrode current collector and containing at least a positive electrode active material. The positive electrode may be preferably prepared by at least (1) mixing the positive electrode active material containing the lithium-containing phosphate compound disclosed herein and optionally a conductive material, a binder and the like in an appropriate solvent to prepare a slurry (including paste and ink; the same applies hereinafter) composition for positive electrode mixture layer formation (hereinafter referred to as "positive electrode mixture slurry"); and (2) applying and drying an appropriate amount of the prepared positive electrode mixture slurry on the positive electrode current collector to form the positive electrode mixture layer (also referred to as the positive electrode active material layer). After drying, the positive electrode mixture layer may be appropriately subjected to pressing and the like in order to adjust the thickness or density thereof.

The positive electrode current collector may preferably be a conductive member formed with a conductive metal such as aluminium, nickel, titanium and stainless steel. The conductive material may preferably be a carbon material such as various carbon black (e.g., acetylene black, ketjen black), graphite powder and carbon fibres. The binder may preferably be polyvinylidene fluoride (PVdF), styrene-butadiene rubber (SBR), polytetrafluoroethylene (PTFE), carboxymethylcellulose (CMC) or the like. The positive electrode active material may be a combination of one or two or more materials which have been conventionally used for non-aqueous electrolyte secondary batteries with the lithium-containing phosphate compound disclosed herein. Other various additives such as dispersing agents and conductive materials may also be appropriately used. The solvent may be either an aqueous solvent or an organic solvent and may be, for example, N-methyl-2-pyrrolidone (NMP).

The negative electrode of the lithium secondary battery disclosed herein comprises a negative electrode current collector and a negative electrode mixture layer formed on the negative electrode current collector and containing at least a negative electrode active material. The negative electrode may be preferably prepared by (1) mixing the negative electrode active material and optionally a binder and the like in an appropriate solvent to prepare a slurry composition for negative electrode mixture layer formation (hereinafter referred to as "negative electrode mixture slurry"); and (2) applying and drying an appropriate amount of the prepared negative electrode mixture slurry on the negative electrode current collector to form the negative electrode mixture layer (also referred to as the negative electrode active material layer). After drying, the negative electrode mixture layer may be appropriately subjected to pressing and the like in order to adjust the thickness or density thereof.

The negative electrode active material may include carbon materials such as graphite, non-graphitizing carbon (hard carbon) and graphitizing carbon (soft carbon); metal oxide materials such as lithium titanates (LTOs; e.g., $Li_4Ti_5O_{12}$, $LiTi_2O_4$, $Li_2Ti_3O_7$), silicon oxides, titanium oxides, vanadium oxides, iron oxides, cobalt oxides, nickel oxides, niobium oxides and tin oxides; metal nitrides such as lithium nitride; metal materials including metals such as tin, silicon, aluminium, zinc and lithium and metal alloys mainly containing these metal elements. In the lithium secondary battery disclosed herein, the positive electrode active material that is the lithium-containing phosphate compound may have a high potential, and thus it is required to use electrolyte solution with a high potential window (i.e., with a wide potential window on the oxidation side). Such an electrolyte solution tends to have, by contrast to high oxidation resistance, low reduction resistance and thus tends to be reduced and decomposed in a negative electrode. Therefore, the negative electrode active material used preferably has a relatively high potential of at or higher than 1 V (vs. $Li^+/Li$).

A suitable example may include LTOs having a standard potential of approximately 1.55 V (vs. Li$^+$/Li).

The positive electrode and the negative electrode are stacked to obtain the electrode assembly which is then placed with electrolyte in an appropriate battery case to give the lithium secondary battery. The typical configuration of the lithium secondary battery disclosed herein includes a separator between the positive electrode and the negative electrode.

The electrolyte is typically electrolyte solution containing a supporting salt (lithium salt) in an appropriate non-aqueous solvent. The supporting salt may be, for example, LiPF$_6$, LiBF$_4$ and the like. The non-aqueous solvent may be, for example, propylene carbonate (PC), ethylene carbonate (EC), diethyl carbonate (DEC), dimethyl carbonate (DMC), ethyl methyl carbonate (EMC) and the like. Among others, EC having high dielectric constant and DMC and EMC having high standard oxidation potential (i.e., wide potential window) are preferably used. The electrolyte solution is preferably prepared so as to have the concentration of the supporting salt in the range of 0.7 mol/L to 1.3 mol/L. The electrolyte solution which is in the form of liquid at a normal temperature (e.g., 25° C.) is preferably used.

The separator may be a porous sheet formed with resins such as polyethylenes (PEs), polypropylenes (PPs), polyesters, celluloses and polyamides, a non-woven cloth and the like. Suitable examples may include single- or multi-layered porous sheets (microporous resin sheets) mainly formed with one or two or more polyolefin resins. For example, PE sheets, PP sheets, trilayered (PP/PE/PP) sheets containing PP layers on either surface of a PE layer and the like can be suitably used.

The material for the battery case may be, for example, a metal material such as aluminium and steel; a resin material such as polyphenylene sulphide resins and polyimide resins and the like. The battery case may have any shape without limitation and may have, for example, a round shape (cylinder, coin and button), a hexahedral shape (rectangular prism, cube), a sack shape, a shape obtained by processing and modifying the above or the like.

Without intending to limit the present invention, the configuration of an exemplary lithium secondary battery (single battery) according to an embodiment is schematically illustrated in FIG. 2 to FIG. 4 which contains a flat and wound electrode assembly (wound electrode assembly) and non-aqueous electrolyte solution in a flat rectangular prism (rectangular) container. In the following figures, members and sites providing similar functions are designated by the same symbols. Duplicated descriptions may be omitted or simplified. The dimension relationship (length, width, thickness and the like) between figures does not reflect the actual dimensional relationship.

FIG. 2 is a perspective view schematically showing an outline of the lithium secondary battery 100 according to the embodiment. FIG. 3 is a schematic view showing a structure in a longitudinal section view of the lithium secondary battery taken along line III-III of FIG. 2. As shown in FIG. 2 and FIG. 3, the lithium secondary battery 100 according to the present embodiment comprises a rectangular prism battery case 50. The battery case 50 comprises a flat, box-shaped (rectangular prism) battery case main body 52 having an opening at the top end and a lid 54 for closing the opening. The battery case 50 comprises, on the top surface thereof (i.e., lid 54), a positive electrode terminal 70 to be electrically connected to a positive electrode sheet 10 in the wound electrode assembly 80 and a negative electrode terminal 72 to be electrically connected to a negative electrode sheet 20 in the electrode assembly. The lid 54 contains, similar to the battery cases for conventional lithium secondary batteries, a safety valve 55 for discharging gas generated in the case to the exterior of the case upon abnormal operation of the battery.

The battery case 50 contains, together with non-aqueous electrolyte solution (not shown), the flat and wound electrode assembly (wound electrode assembly) 80 including an elongated positive electrode sheet 10 and an elongated negative electrode sheet 20 that are wound with elongated separators 40A and 40B interposed therebetween. A positive electrode current collecting plate and a negative electrode current collecting plate are respectively attached along an edge 74 of the positive electrode sheet 10 where the positive electrode mixture layer is not formed (i.e., an exposed portion of the positive electrode current collector) and an edge 76 of the negative electrode sheet 20 where the negative electrode mixture layer is not formed (i.e., an exposed portion of the negative electrode current collector), and electrically connected to the positive electrode terminal 70 and the negative electrode terminal 72, respectively.

FIG. 4 is a diagrammatic view showing an elongated sheet structure (electrode sheet) before the wound electrode assembly 80 is assembled. The wound electrode assembly 80 contains the positive electrode sheet 10 which contains the positive electrode mixture layer 14 formed along a longitudinal direction on one or either surface (typically either surface) of the elongated positive electrode current collector 12 and the negative electrode sheet 20 which contains the negative electrode mixture layer 24 formed along a longitudinal direction on one or either surface (typically either surface) of the elongated negative electrode current collector 22, wherein the sheets are stacked with two elongated separators 40A and 40B and wound along a longitudinal direction and the obtained wound electrode assembly is pressed from the lateral direction and bent to have a flat shape.

The lithium secondary battery disclosed herein suitably exhibits the effects due to inclusion of the lithium-containing phosphate compound as the positive electrode active material, and is characterized in that the battery has excellent thermostability and cycle characteristics compared to conventional secondary batteries. For example, the lithium secondary battery disclosed herein can stably exhibit excellent battery performances (e.g., energy density, power density) for a prolonged period of time and thus has high reliability and durability. Thus, by utilizing such properties, the lithium secondary battery disclosed herein can be suitably applied to, as shown in FIG. 5, for example, a power source (driving power source) for a motor on a vehicle 1 such as an automobile. The vehicle 1 is not particularly limited and may be typically a plug-in hybrid vehicle (PHV), a hybrid vehicle (HV), an electric vehicle (EV), a fuel cell vehicle (FCV) or the like. The lithium secondary battery 100 may be used solely (namely as a single battery) or used as an assembled battery containing multiple batteries connected in series and/or in parallel.

The present invention is now specifically illustrated by way of Examples which do not intend to limit the present invention.

Lithium secondary batteries were prepared which contained the olivine-type lithium-containing phosphate compounds disclosed herein and verified for battery performances.

<<I. Evaluation Test for $LiNiPWO_4$ (the Case where the M Element is Ni)>>

Example 1: $LiNiP_{0.99}W_{0.01}O_4$

A Li source, lithium acetate dihydrate [$Li(CH_3COO) \cdot 2H_2O$] (Nacalai Tesque, Inc.), a Ni source, nickel acetate (II) tetrahydrate [$Ni(CH_3COO)_2 \cdot 4H_2O$] (Nacalai Tesque, Inc.), a P source, ammonium dihydrogen phosphate [$NH_4H_2PO_4$] (Nacalai Tesque, Inc.) and a W source, tungsten (V) ethoxide [$C_{10}H_{25}O_5W$] (Alfa Aesar) were weighed so as to have the molar ratio between the elements of Li:Ni:P:W=1:1:0.99:0.01. The compounds were dissolved in a solvent, ion-exchange water (1 L), while adjusting the pH with concentrated nitric acid so that the solution has pH≤1.5. A chelating agent for suppressing growth of particles, glycolic acid [$C_2H_4O_3$] (Nacalai Tesque, Inc.) was added and dissolved in the solution at a 5 molar equivalent amount of the molar amount of $LiNiPWO_4$ to be synthesized, to prepare a sol state starting material mixture. The obtained sol state starting material mixture was heated to 80° C. in an oil bath while stirring for approximately 20 hours to evaporate the solvent and obtain a gel-like starting material mixture. The gel-like starting material mixture was dried in a drying furnace at 80° C. for 24 hours before preliminary firing at 350° C. The obtained product resulting from the preliminary firing was ground in a mortar, classified with a 100-μm mesh and further ground in a ball mill for 3 hours. The ground product resulting from the preliminary firing and conductive powder, ketjen black (ECP-600JD; Ketjen black International, primary particle diameter: approximately 30 nm to 50 nm) were mixed in a mortar and further mixed (stirred) in a ball mill for 25 hours in order to coat the product resulting from the preliminary firing with conductive powder. The product resulting from the preliminary firing coated with conductive powder was fired under an argon atmosphere at 600° C. for 1 hour.

Example 2: $LiNiP_{0.97}W_{0.03}O_4$

The titled compound was synthesized by the similar procedures as Example 1 except that the starting materials were weighed so as to obtain the molar ratio between the elements of Li:Ni:P:W=1:1:0.97:0.03.

Example 3: $LiNiP_{0.95}W_{0.05}O_4$

The titled compound was synthesized by the similar procedures as Example 1 except that the starting materials were weighed so as to obtain the molar ratio between the elements of Li:Ni:P:W=1:1:0.95:0.05.

Comparative Example 1: $LiNiPO_4$

The titled compound was synthesized by the similar procedures as Example 1 except that the starting materials were weighed so as to obtain the molar ratio between the elements of Li:Ni:P:W=1:1:1:0 (i.e., without using the W source, tungsten (V) ethoxide [$C_{10}H_{25}O_5W$]).

Comparative Example 2: $LiNiP_{0.97}W_{0.03}O_4$ (Solid Phase Method)

In this Comparative Example, it was sought to synthesize the titled compound by a solid phase method. Specifically, a Li source, lithium acetate dihydrate [$Li(CH_3COO) \cdot 2H_2O$], a Ni source, nickel (II) acetate tetrahydrate [$Ni(CH_3COO)_2 \cdot 4H_2O$], a P source, ammonium dihydrogen phosphate [$NH_4H_2PO_4$] and a W source, tungsten oxide [$WO_3$] (Nanostructured & Amorphous Materials, Inc.) were weighed so as to have the molar ratio between the elements of Li:Ni:P:W=1:1:0.97:0.03 and mixed in a mortar. The starting material mixture was fired under the atmospheric condition at 600° C. for 1 hour.

<X-Ray Diffractometry>

$LiNiPWO_4$ samples (powder) immediately after synthesis were measured on a X-ray diffractometer under the following conditions. The resulting diffraction patterns are shown in FIG. 6 (Comparative Example 1 and Examples 1 to 3) and FIG. 8 (Comparative Example 2).

Measurement instrument: X-ray diffractometer from Rigaku Corporation: model "Ultima IV"

X-ray source; CuKα ray

Tube voltage; 50 kV, tube current; 250 mA

Scanning range; $10° \leq 2\theta \leq 80°$, scanning speed; 10°/min.

Slits; divergence slit=1°, scatter slit=1°, receiving slit=0.1 mm

Integration frequency; 3

As shown in FIG. 6, the compounds of Example 1 and Example 2 (i.e., the content ratio of W element is 1 to 3%) had the structures with both the space group Cmcm and the space group Pnma. On the other hand, it was confirmed that the compound of Comparative Example 1 (without addition of W) had the structure with only the space group Pnma and the compound of Example 3 (the content ratio of W element is 5%) had the structure with only the space group Cmcm. The crystal structures may vary depending on the content ratio of W element because the stable structures may vary depending on the balances between ionic radii.

In addition, as shown in FIG. 8, a peak derived from $LiNiPWO_4$ was not observed for the compound of Comparative Example 2 which was prepared by the sold phase method. Thus, it was found that in order to control the crystal state of the lithium-containing phosphate compound, it is required to use a method that allows control of the crystal structure at an atomic level such as a liquid phase method (typically sol-gel method described in Examples).

<Preparation of Positive Electrode>

Positive electrodes were prepared with $LiNiPWO_4$ synthesized in Examples 1 to 3 and Comparative Example 1, respectively. Namely, the synthesized positive electrode active material, $LiNiPWO_4$, a conductive material, acetylene black (HS-100; Denki Kagaku Kogyo Kabushiki Kaisha), and a binder, polyvinylidene fluoride (Kureha KF polymer #9305; Kureha Corporation), were mixed so as to obtain the mass ratio between the materials of approximately 75:20:5 and kneaded while the viscosity was adjusted with N-methylpyrrolidone (Wako Pure Chemical Industries, Ltd.) to prepare positive electrode mixture slurry. The slurry was applied by a doctor blade method on one surface of an elongated aluminium foil (positive electrode current collector) having a thickness of approximately 15 μm so as to obtain an electrode areal weight of approximately 3.0 mg/cm². The positive electrode obtained after application of the positive electrode mixture slurry was dried at 80° C. and pressed on a pressing machine to obtain a sheet-shaped positive electrode (positive electrode sheet), which was then punched out to a round shape with a diameter of 16 mm to obtain a positive electrode (Examples 1 to 3 and Comparative Example 1).

<Preparation of Negative Electrode>

A negative electrode active material, lithium titanate [$Li_4Ti_5O_{12}$], a conductive material, acetylene black (HS-100; Denki Kagaku Kogyo Kabushiki Kaisha), and a binder, polyvinylidene fluoride (Kureha KF polymer #9305; Kureha Corporation), were mixed so as to obtain the mass ratio between the materials of 85:5:10 and kneaded while the viscosity was adjusted with N-methylpyrrolidone (Wako Pure Chemical Industries, Ltd.) to prepare negative electrode mixture slurry. The slurry was applied by a doctor blade method on one surface of an elongated copper foil (negative electrode current collector) having a thickness of approximately 10 μm so as to obtain an electrode areal weight of approximately 1.7 mg/cm². The negative electrode obtained after application of the negative electrode mixture slurry was dried at 80° C. and pressed on a pressing machine to obtain a sheet-shaped negative electrode (negative electrode sheet), which was then punched out to a round shape with a diameter of 19 mm to obtain a negative electrode.

<Assembly of Lithium Secondary Battery>

The thus prepared round-shaped positive and negative electrodes were arranged so that they oppose each other with a separator (a 3-layer porous sheet of polypropylene (PP)/polyethylene (PE)/polypropylene (PP) having a diameter of 22 mm and a thickness of 0.02 mm was used) therebetween. The thus prepared electrode assembly was placed in a coin type case (CR 2032 type cell) with non-aqueous electrolyte solution (a solution of an electrolyte, $LiPF_6$, at a concentration of approximately 1 mol/L in a mixed solvent of ethylene carbonate (EC), dimethyl carbonate (DMC) and ethyl methyl carbonate (EMC) at a volume ratio of 3:4:3 was used). Accordingly, lithium secondary batteries of Examples 1 to 3 and Comparative Example 1 were assembled.

<Cyclic Voltammetry (CV) Test>

The thus assembled lithium secondary batteries were subjected to a cyclic voltammetry (CV) test under the following conditions.

Measurement instrument; Solartron 1255B
Scanning range; 0 V to 4 V (vs. LTO)
Sweep rate; 0.2 mV/s
Cycles; 3

<X-Ray Diffractometry (after CV Test)>

After the CV test, the batteries were disassembled in a glove box and the positive electrodes were recovered and washed in a solvent (DMC was used) for a few times. The positive electrode samples (plate-shaped) were subjected to XRD measurements by the similar manner described above in order to compare the crystal structures before and after the CV measurement. The XRD measurement after CV test was carried out without exposing to the atmosphere. The diffraction patterns after CV test are shown in FIG. 7.

As shown in FIG. 7, the compounds of Example 1 and Example 2 (i.e., the content ratio of W element is 1 to 3%) having the structures with both the space group Cmcm and the space group Pnma showed significant crystal peaks even after the CV test, indicating excellent stability thereof. The compound of Example 3 (the content ratio of W element is 5%) having the structure with only the space group Cmcm showed a slight decrease in the crystal peak after the CV measurement. On the other hand, no crystal peak was observed for the compound of Comparative Example 1 (without addition of W) having the structure with only the space group Pnma because the pattern was broad. Thus, it was estimated that the crystal structure was decomposed.

From the above results, a technical significance of the content ratio of W element in the lithium-nickel-containing phosphate compound of 1% or more (preferably 1% to 5%, more preferably 1% to 3%) was demonstrated. In other words, a technical significance of the value of y in the general formula: $Li_xNi[P_{(1-y)}A_y]O_4$ of 0.01 or more (preferably 0.01 to 0.05, more preferably 0.01 to 0.03) was demonstrated.

<<II. Evaluation Test for $LiMnPWO_4$ (The Case where the M Element is Mn)>>

Example 11: $LiMnP_{0.99}W_{0.01}O_4$

In this Example, $LiMnP_{0.99}W_{0.01}O_4$ was synthesized. Specifically, the positive electrode active material was synthesized by the similar procedures described in Example 1 in <<I. Evaluation test for $LiNiPWO_4$>> except that the Ni source used therein (nickel (II) acetate tetrahydrate [Ni(CH$_3$COO)$_2$.4H$_2$O]) was replaced by a Mn source, manganese (II) acetate tetrahydrate [Mn(CH$_3$COO)$_2$.4H$_2$O]).

Example 12: $LiMnP_{0.97}W_{0.03}O_4$

The positive electrode active material was synthesized by the similar procedures as Example 11 except that the starting materials were weighed so as to obtain the molar ratio between the elements of Li:Mn:P:W=1:1:0.97:0.03.

Example 13: $LiMnP_{0.95}W_{0.05}O_4$

The positive electrode active material was synthesized by the similar procedures as Example 11 except that the starting materials were weighed so as to obtain the molar ratio between the elements of Li:Mn:P:W=1:1:0.95:0.05.

Example 14: $LiMnP_{0.9}W_{0.1}O_4$

The positive electrode active material was synthesized by the similar procedures as Example 11 except that the starting materials were weighed so as to obtain the molar ratio between the elements of Li:Mn:P:W=1:1:0.9:0.1.

Comparative Example 11: $LiMnPO_4$

The positive electrode active material was synthesized by the similar procedures as Example 11 except that the starting materials were weighed so as to obtain the molar ratio between the elements of Li:Mn:P=1:1:1 (i.e., the composition without W in the crystal structure).

Comparative Example 12

In this Comparative Example, $LiMnPO_4$ obtained in Comparative Example 11 was merely mixed with tungsten oxide [$WO_3$]. Specifically, $LiMnPO_4$ and tungsten oxide [$WO_3$] were weighed so that the composition ratio in the positive electrode mixture layer described hereinafter was ($WO_3$/($LiMnPO_4$+$WO_3$))=0.01 and simply mixed in a mortar to prepare the positive electrode active material.

Comparative Example 13

The positive electrode active material was prepared by the similar procedures as Comparative Example 12 except that the starting materials were weighed so as to obtain the composition ratio in the positive electrode mixture layer of ($WO_3$/($LiMnPO_4$+$WO_3$))=0.03.

Comparative Example 14

The positive electrode active material was prepared by the similar procedures as Comparative Example 12 except that the starting materials were weighed so as to obtain the composition ratio in the positive electrode mixture layer of $(WO_3/(LiMnPO_4+WO_3))=0.05$.

Comparative Example 15

The positive electrode active material was prepared by the similar procedures as Comparative Example 12 except that the starting materials were weighed so as to obtain the composition ratio in the positive electrode mixture layer of $(WO_3/(LiMnPO_4+WO_3))=0.1$.

<Measurement of Primary Particle Diameter>

$LiMnPWO_4$ samples (powder) of Examples 11 to 13 and Comparative Example 11 immediately after synthesis were measured for the primary particle diameter with electron microscopes. A transmission electron microscope and a scanning electron microscope were used for Comparative Example 11 and Example 11 and Examples 12 and 13, respectively. Specifically, samples were observed by electron microscopy and 100 primary particles were measured for the size thereof. An arithmetic average was calculated from the results, which served as a particle diameter. The particle diameter of the samples is shown in Table 1.

TABLE 1

| $LiMnPWO_4$ | Comparative Example 11 | Example 11 | Example 12 | Example 13 |
|---|---|---|---|---|
| Amount of W added (%) | 0 | 1 | 3 | 5 |
| Average particle diameter (nm) | 50 | 50 | 70 | 70 |

<X-Ray Diffractometry>

The obtained $LiMnPWO_4$ samples (powder) were measured for the crystal structures thereof with the same X-ray diffractometer and conditions as the measurement method described in <<I. Evaluation test for $LiNiPWO_4$>>. The resulting diffraction patterns are shown in FIG. 9.

As shown in FIG. 9, the peak around $2\theta=35°$ shifted towards a low angle range (i.e., the distance between crystal lattices was increased) with an increase in the content ratio of W element. A further analysis demonstrated that this extension in the crystal lattices occurred because the sites of P elements in the general formula were substituted by W elements.

<Preparation of Positive Electrode and Assembly of Lithium Secondary Battery>

The synthesized (prepared) positive electrode active materials were used for preparation of positive electrodes (Examples 11 to 14 and Comparative Examples 11 to 15) by the similar procedures as the method described in Example 1 in <<I. Evaluation test for $LiNiPWO_4$>>. Then lithium secondary batteries of Examples 11 to 14 and Comparative Examples 11 to 15 were assembled by the similar procedure as Example 1 in <<I. Evaluation test for $LiNiPWO_4$>> except that metal lithium (a metal lithium foil with a diameter of 19 mm and a thickness of 0.22 mm) was used as the negative electrode.

<Differential Thermal Analysis (after Charge)>

The assembled lithium secondary batteries were charged. Specifically, the batteries were charged at constant current of a rate of 0.05 C up to 4.8 V and then charged at constant voltage up to 35 hours in total. The batteries at a charged (high potential) state were disassembled in a glove box and the positive electrodes were recovered and washed in a solvent (DMC was used) for a few times. The positive electrode mixture layers were peeled off from the positive electrodes using a resin spatula and subjected to a differential thermal analysis (DSC; Differential Scanning Calorimetry) under the following conditions. DSC measurements allow measurement of thermal behaviour of samples upon temperature change; it is considered that a sample has high thermostability when a peak top temperature obtained from the measurement is high.

Measurement instrument; Shimadzu DSC-60
Reaching temperature; 400° C., heating rate; 5° C./min.
Purge gas; nitrogen (flow rate; 50 ml/min.)
Container; stainless pan
Sample amount; approximately 5 mg The relation between the exothermic peak top temperature (° C.) obtained from DSC measurements and the content ratio of W element (i.e., corresponding to the content ratio of W element in the crystal structures for Examples and the content ratio (%) of $WO_3$ in positive electrode mixture layers for Comparative Examples) is shown in FIG. 10.

As shown in FIG. 10, almost no change in the exothermic peak top temperature was observed for the lithium secondary batteries of Comparative Examples 12 to 15 obtained by directly adding the W source, tungsten oxide [$WO_3$] to the positive electrode mixture layer, even when the content ratio of $WO_3$ was increased up to as high as 10% (Comparative Example 5). On the other hand, the lithium secondary batteries of Examples 11 to 14 containing $LiMnPWO_4$ synthesized according to the production method disclosed herein as the positive electrode active material showed an increase in the exothermic peak top temperature when the content ratio of W element was increased up to 5%. The reason for this is believed to be as follows: lithium ions are more smoothly absorbed and stored and released during charge and discharge and the stability of the crystal structure is improved because the distance between crystal lattices is increased due to replacement of some P elements by W elements as can be seen from the results obtained by XRD (FIG. 9). When the content ratio of W element is 5% or more (e.g., when the content ratio of W element is 10% (Example 14)), the exothermic peak top temperature was slightly decreased. The reason for this is believed to be as follows: the content ratio of W element may exceed the limit where the crystal structure can be stable, and thus the crystal structure may have an increased instability.

The above results demonstrated that the lithium-manganese-containing phosphate compound containing W element at the content ratio of 1% to 15% (preferably 1% to 10%) may have an improved thermostability compared to conventional compounds. In other words, a technical significance of the value of y in the general formula: $Li_xMn[P_{(1-y)}A_y]O_4$ of 0.01 to 0.15 (preferably 0.01 to 0.1) was demonstrated.

The present invention has been described in detail hereinabove; the above embodiments and Examples are merely exemplary and do not limit the scope of the claims. The scope of the claims encompasses various modifications and alterations of the above specific examples.

INDUSTRIAL APPLICABILITY

The lithium secondary battery containing the positive electrode active material disclosed herein can be applied for various applications. Because the battery has high battery capacity and excellent crystal structure stability, it can exhibit excellent performances at a high potential region or under conditions with relatively high temperatures. Thus, by exploiting these features, the battery can be suitably used for driving power sources for motors on vehicles such as automobiles. Vehicles are not particularly limited and may be plug-in hybrid vehicles (PHVs), hybrid vehicles (HVs), electric vehicles (EVs) and the like. Thus, in other aspects of the present invention, a vehicle comprising any non-aqueous electrolyte secondary battery (which may be an assembled battery) disclosed herein is provided.

REFERENCE SIGNS LIST

S10 Preparation of starting material mixture
S20 Heating
S30 Firing
S310 Preliminary firing
S320 Main firing
1 Automobile (vehicle)
10 Positive electrode sheet (positive electrode)
12 Positive electrode current collector
14 Positive electrode mixture layer
20 Negative electrode sheet (negative electrode)
22 Negative electrode current collector
24 Negative electrode mixture layer
40A, 40B Separator sheet
50 Battery case
52 Case main body
54 Lid
55 Safety valve
70 Positive electrode terminal
72 Negative electrode terminal
74 Exposed portion of positive electrode current collector
76 Exposed portion of negative electrode current collector
80 Wound electrode assembly
100 Lithium secondary battery

The invention claimed is:

1. A lithium secondary battery comprising an electrode assembly having a positive electrode and a negative electrode,
where the positive electrode contains positive electrode active material particles mainly containing an olivine-type lithium-containing phosphate compound represented by the general formula: $Li_xM[P_{(1-y)}A_y]O_4$
where M is one or two elements selected from the group consisting of nickel (Ni), manganese (Mn), iron (Fe) and cobalt (Co), and x and y are real numbers satisfying $0<x\le 2$ and $0<y\le 0.15$, and
wherein an A element in the general formula is a pentavalent metal element, and
wherein the lithium-containing phosphate compound has a crystal structure with a space group Cmcm and a space group Pnma.

2. The lithium secondary battery according to claim 1, wherein the pentavalent metal element is tungsten (W).

3. The lithium secondary battery according to claim 1, wherein the lithium-containing phosphate compound contains manganese (Mn) as the M element, and y satisfies $0<y\le 0.1$.

4. The lithium secondary battery according to claim 1, wherein the lithium-containing phosphate compound contains nickel (Ni) as the M element, and y satisfies $0<y\le 0.05$.

5. The lithium secondary battery according to claim 1, wherein the particles of the positive electrode active material are coated at least partially with conductive powder.

6. The lithium secondary battery according to claim 1, wherein the particles of the positive electrode active material have a primary particle diameter, as measured by electron microscopy, of 10 nm or more and 200 nm or less.

7. The lithium secondary battery according to claim 1, wherein the negative electrode contains at least lithium titanate as a negative electrode active material.

8. A method for producing a positive electrode active material for a lithium secondary battery,
the method comprising:
preparing a starting material mixture by mixing, in an aqueous solvent, a lithium source, a phosphoric acid source, an M element source and an A element source as starting materials for an olivine-type lithium-containing phosphate compound represented by the general formula: $Li_xM[P_{(1-y)}A_y]O_4$, where M is one or two or more elements selected from the group consisting of nickel (Ni), manganese (Mn), iron (Fe) and cobalt (Co); A is a pentavalent metal element; and x and y are real numbers satisfying $0<x\le 2$ and $0<y\le 0.15$;
heating the starting material mixture to obtain a gel-like starting material mixture; and
firing the gel-like starting material mixture at or lower than 800° C.,
wherein the lithium-containing phosphate compound has a crystal structure with a space group Cmcm and a space group Pnma.

9. The method according to claim 8, wherein the starting material mixture is prepared in the aqueous solvent having pH 3 or lower.

10. The method according to claim 8, wherein a chelating agent is added in the preparation of the starting material mixture.

11. The method according to claim 8, wherein the firing comprises:
preliminarily firing the gel-like starting material mixture at or lower than 400° C.; and
mixing a product resulting from the preliminary firing with conductive powder and subjecting the mixture to main firing at a temperature at or higher than the preliminary firing temperature and at or lower than 800° C.

12. The method according to claim 11, wherein the preliminary firing is carried out at 120° C. or higher and 400° C. or lower.

13. The method according to claim 11, wherein the conductive powder used is a carbon material having a primary particle diameter, as measured by electron microscopy, of 10 nm or more and 100 nm or less.

14. A lithium secondary battery comprising a positive electrode containing a positive electrode active material obtained by the method according to claim 8.

* * * * *